No. 831,098. PATENTED SEPT. 18, 1906.
J. J. REDNER.
INSECT TRAP.
APPLICATION FILED JULY 11, 1906.

2 SHEETS—SHEET 1.

No. 831,098. PATENTED SEPT. 18, 1906.
J. J. REDNER.
INSECT TRAP.
APPLICATION FILED JULY 11, 1906.

2 SHEETS—SHEET 2.

Witnesses
Inventor
J. J. REDNER
By his Attorneys

UNITED STATES PATENT OFFICE.

JOHN J. REDNER, OF NEW YORK, N. Y.

INSECT-TRAP.

No. 831,098.     Specification of Letters Patent.     Patented Sept. 18, 1906.

Application filed July 11, 1906. Serial No. 325,569.

*To all whom it may concern:*

Be it known that I, JOHN J. REDNER, a citizen of the United States, residing in the city, county, and State of New York, have invented certain new and useful Improvements in Insect-Traps, of which the following is a full, clear, and exact description.

My invention relates to improvements in traps for flies and other insects.

The object is to provide a simple and efficient mechanism for that purpose which may be constructed at small cost.

The invention consists in improvements the principles of which are illustrated in the accompanying two sheets of drawings.

Figure 1:
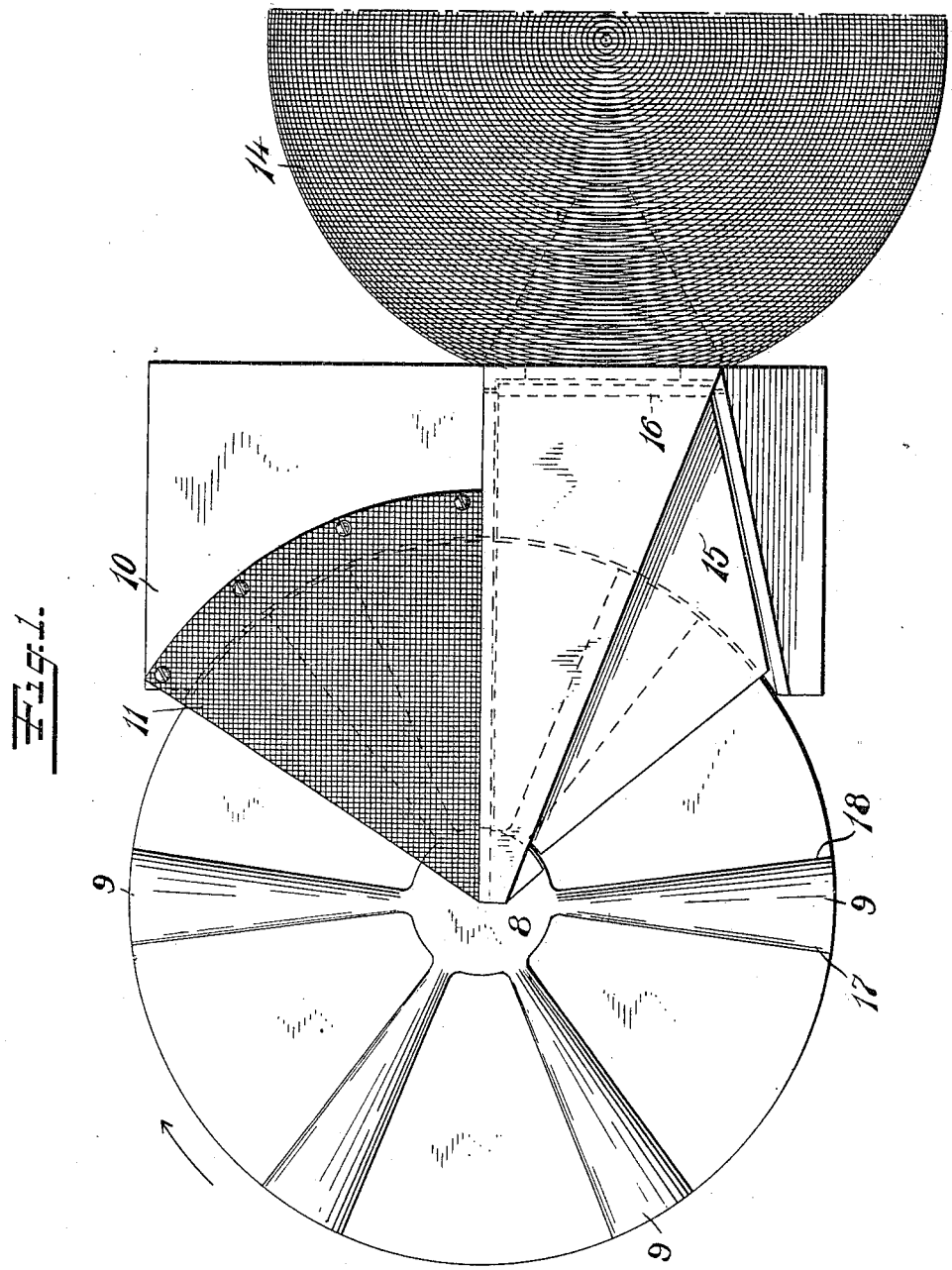
Figure 2:
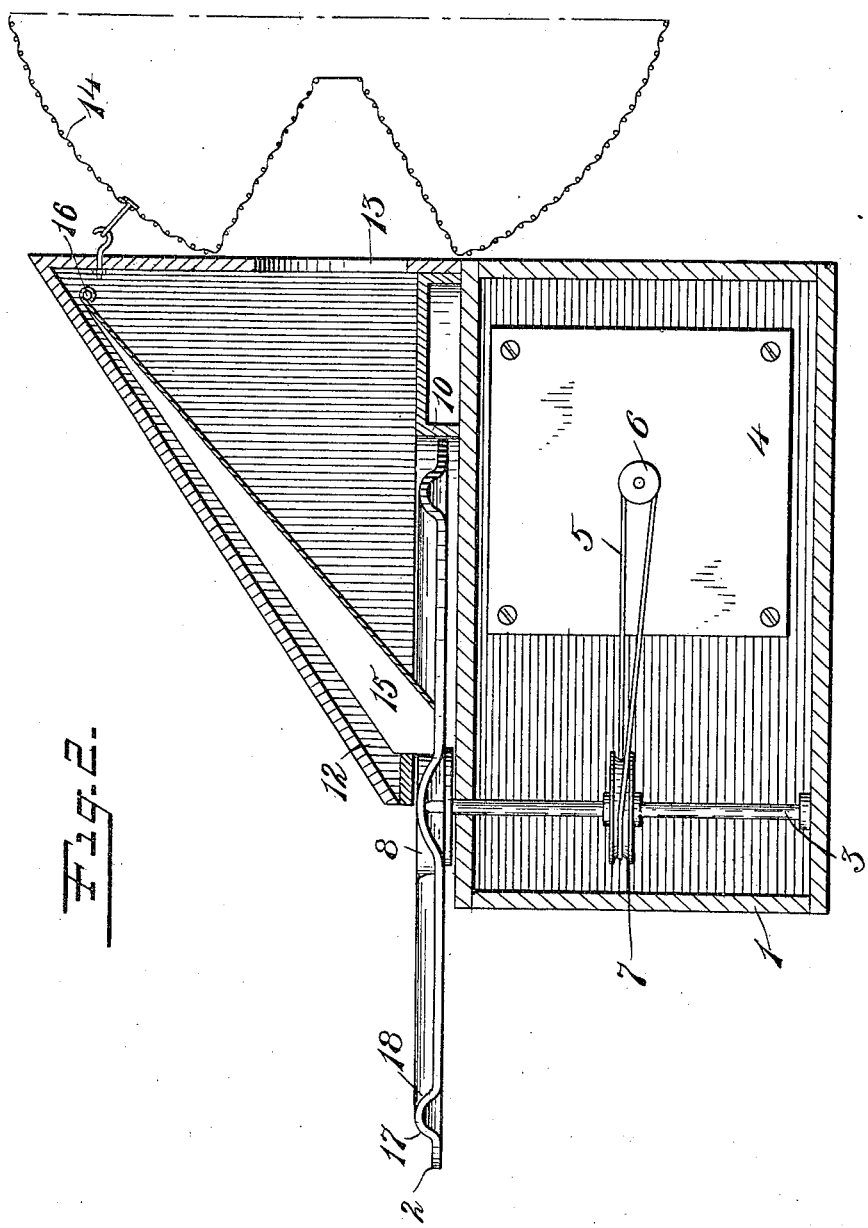

Figure 1 is a plan view, and Fig. 2 is a vertical sectional view.

The standard or supporting-frame 1 may conveniently be made in the form of a box.

The conveyer or table 2 upon which the insects alight is in the form of a circular disk carried by the vertical shaft 3, which is mounted in the frame.

Suitable automatic means is provided for driving the disk slowly and uniformly—as, for instance, clock mechanism contained in the case 4. The cord, belt, or chain 5 connects the clock-mechanism pulley 6 with the disk-shaft pulley 7. The disk is preferably constructed of cardboard and has a raised hub 8 and radiating projections 9 9, forming pockets between them. Some suitable material, such as sugar or molasses, is placed on the disk between the projections in order to attract the insects.

Around a portion of the periphery of the disk is arranged a guard 10. Mounted above the guard 10 and extending over a portion of the surface of the disk is a screen 11, preferably slightly greater than the area between the centers of two of the ribs of projections 9 9 and lying close to the top of the hub and the top of the ribs, so that as soon as a rib passes beneath the edge of the screen 11 any insects in front of the rib will be captured beneath the screen and within the space bounded by the disk and its hub and ribs and the guard 10.

A discharging-chamber, also preferably formed of cardboard, is located above the disk and has a vertical wall 12, which comes down to the screen 11. This discharging-chamber has an outlet 13, leading into a receiving-basket 14. The light coming through this opening 13 attracts the insects as soon as they emerge from beneath the lower edge of the wall 12, so that they fly out and pass into the basket 14, where they are retained and in which they may be destroyed or from which they may be otherwise disposed of.

15 is a flap, also preferably constructed of cardboard, and loosely hung from the point 16 and having its lower edge resting upon the disk, so that when the disk rotates any insects still clinging to it will be struck by the lower edge of the flap and so disturbed that they will leave the disk and pass out into the receiving-basket.

The projections 9 9 are preferably rounded on the sides, as at 17 and 18, so that the edge of the flap may more easily ride up and down as the disk rotates and avoid lifting the flap in such a way as to permit insects to escape. The speed of the disk should be so regulated that the flap will have time to slide down the back side 18 of each rib without jumping from the top to the bottom to the space between the ribs.

What I claim is—

1. In an insect-trap, a rotating disk having an upwardly-projecting hub and upwardly-projecting radial ribs arranged at intervals, a guard encircling a portion of the periphery of the disk, a screen covering a portion of the disk between the hub and guard, a discharge-chamber having an outlet, and a flap forming one wall of the chamber and coacting with the disk between its hub and the guard.

2. An insect-trap, comprising a rotating disk having projecting ribs, a guard encircling a portion of the periphery of the disk, a screen above the disk and extending to the guard, a discharge-chamber having an outlet, and a flap coacting with the disk for the purpose specified.

JOHN J. REDNER.

Witnesses:
F. E. MOORE,
CHAS. A. PEARD.